(12) United States Patent
Ishii et al.

(10) Patent No.: US 6,349,943 B1
(45) Date of Patent: Feb. 26, 2002

(54) LUBRICATING RESIN COMPOSITION SEAL RINGS

(75) Inventors: Takuya Ishii; Kenji Ito, both of Mie (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 09/584,093

(22) Filed: May 31, 2000

(30) Foreign Application Priority Data

May 31, 1999 (JP) .............................. 11-152485
Apr. 27, 2000 (JP) ........................ 2000-127855

(51) Int. Cl.$^7$ ................................................. F16J 9/28
(52) U.S. Cl. ...................................................... 277/448
(58) Field of Search ................................ 277/435, 448, 277/496

(56) References Cited

U.S. PATENT DOCUMENTS

| | | | |
|---|---|---|---|
| 4,706,971 A | * | 11/1987 | Schirmer |
| 5,131,827 A | * | 7/1992 | Tasaka |
| 5,312,866 A | * | 5/1994 | Tsutsumi et al. |
| 5,364,111 A | * | 11/1994 | Wunsch |
| 5,618,873 A | * | 4/1997 | Tanaka et al. |
| 5,726,232 A | * | 3/1998 | Egami et al. |
| 5,900,453 A | * | 5/1999 | Egami et al. |

FOREIGN PATENT DOCUMENTS

JP    9-118824 A   *   5/1997

\* cited by examiner

*Primary Examiner*—Anthony Knight
*Assistant Examiner*—John L. Beres
(74) *Attorney, Agent, or Firm*—Wenderoth, Lind & Ponack, L.L.P.

(57) ABSTRACT

A seal ring that is high in wear resistance and sealability, and less likely to damage an aluminum alloy mating member, and particularly a seal ring having an outer diameter of 20 mm or under and formed with a slit which can be opened easily to be fitted on a shaft. The seal ring is made from a lubricating resin composition containing 50–90 vol % of an aromatic polyether ketone resin, 5–30 vol % of an aromatic polyamide fiber, and 2–30 vol % of tetrafluoroethylene resin. The composition may further contain 2–20 vol % of mica or talc, or 2–30 vol % of a whisker having a Mohs hardness of 3 or over. The seal ring is formed with a slit and has an an outer diameter of 20 mm or under with a bending strain (under ASTM D790) of 3% or over.

7 Claims, 1 Drawing Sheet

LUBRICATING RESIN COMPOSITION SEAL RINGS

BACKGROUND OF THE INVENTION

This invention relates to lubricating resin compositions and seal rings and other sealing members formed of the same.

Sealing members such as seal rings are used in hydraulic devices cooperating with an automatic speed change gear such as a non-stage transmission. According to the use environment, a seal member made mainly of cast iron or a synthetic resin is selectively used. It is required that such seal members be high in oil sealability, low in friction, high in wear resistance, less likely to damage a mating metallic member, and easy to handle in fitting on a shaft.

Among conventional seal members, those made of cast iron have passable wear resistance but are low in sealing properties. Thus, a hydraulic unit in which are used cast iron seals requires a large-sized oil pump to compensate for oil leak through the seals. Cast iron seals are higher in elastic modulus and lower in toughness than synthetic resin seals. Thus it is difficult to fit a seal member made of cast iron on e.g. a shaft. This is especially true for an oil seal ring, a kind of seal member which is typically split by a slit at one point of its circumference. Such an oil seal ring made of cast iron and having an outer diameter of 20 mm or under tends to break when it is deformed to widen the slit to fit the ring on a shaft.

On the other hand, synthetic resins such as tetrafluoroethylene, polyamide, polyphenylene sulfide, aromatic thermoplastic polyimide, and aromatic polyether ketone are lower in elastic modulus than cast iron. Thus, a seal ring molded of such a resin and various fillers is less likely to snap when deformed to widen the slit. It is also high in sealability.

Among such synthetic resins, tetrafluoroethylene resin is especially low in elastic modulus, high in sealability and low in friction. Thus, many conventional seal members are made mainly of this resin with various fillers added to improve wear resistance and creep resistance.

However, such a seal ring has one drawback that if brought into frictional contact with a mating member at high speed in a high-temperature environment, typically at 100° C. or over, wear tends to progress quickly even before the surface pressure reaches 1 MPa. Compressive creeping is also high. Thus, in such an environment, this type of seal ring cannot maintain high sealability.

A seal member made of polyamide or polyphenylele sulfide resin tends to melt and thus wear severely if brought into frictional contact with a mating member at high speed in a high-temperature atmosphere. Thus, if such seal members are used as oil seals, oil leak can occur.

A seal member made of an aromatic thermoplastic polyimide resin is high in heat resistance but low in toughness. Thus a seal ring having a slit and made of this resin is difficult to widen the slit. It is not wear-resistant either.

A seal member made of an aromatic polyether ketone resin has a moderate elasticity and a sufficient toughness, so that it can be easily fitted on e.g. a shaft. It also maintains low friction and high wear resistance when brought into frictional contact with a mating member at high speed even in a high-temperature atmosphere of 100° C. or over.

According to the type of mating metallic member, different kinds of fillers are added to seal members made of aromatic polyether ketone resin. Typical such-fillers include glass fiber, carbon fiber, potassium titanate whisker, graphite, mica, talc and tetrafluoroethylene resin.

Of these fillers, fibrous fillers such as glass fiber, carbon fiber, and potassium titanate whisker, and flaky fillers such as graphite, mica, and talc are used to improve mechanical properties and wear resistance. Solid lubricant such as tetrafluoroethylene, graphite, and molybdenum disulfide are used to improve frictional properties.

But seal rings containing such fillers have a drawback that it is difficult to widen the slit and thus to mount the ring on e.g. a shaft. The degree of difficulty in widening the slit depends on the kind and amount of fillers used. For example, it is especially difficult to widen the slit of a seal ring containing a large amount of flaky fillers such as graphite, mica or talc. Thus, for a small seal ring of synthetic resin having an outer diameter of 20 mm or under, it has been difficult to meet all the requirements, i.e. low friction, wear resistance and ease of mounting.

A seal member containing both carbon fiber and a solid lubricant has passable fritional/wear properties (Japanese patent publications 61-58093 and 9-142487). But such a seal ring containing both of them and having an outer diameter of 20 mm or under tends to be low in wear resistance and sealability if the filler contents are reduced so that the slit can be widened easily. If such a seal member is used with a mating member made of an aluminum alloy, the carbon fiber in the seal ring tends to damage the soft mating member. The damaged mating member in turn causes abnormal wear of the seal ring.

In Japanese patent publications 1-29379 and 2-175793, seal members containing both potassium titanate whisker and a solid lubricant are disclosed. If such seals are brought into frictional contact with a mating member at high speed at high temperature, typically 100° C. or over, the reinforcing effect of the potassium titanate whisker tends to be insufficient, thus increasing the amount of wear. Further, if these seals are brought into frictional contact with a mating member made of an aluminum alloy, the former tends to damage the latter. This leads to reduced sealability.

In order to prevent damage to a mating member made of an aluminum alloy, seal members containing a particulate or flaky filler or a solid lubricant were proposed in Japanese patent publications 8-159292 and 10-53700. But they still have insufficient wear resistance and tend to damage a mating member.

Even a seal member containing carbon fiber, a particulate or flaky filler and a solid lubricant still damages an aluminum alloy mating member. One way to reduce attack to the aluminum alloy mating member is to add a large amount of flaky fillers. But this makes it increasingly difficult to widen the slit of a seal ring and amount it.

For a hydraulic unit in which are mounted seals such as seal rings, compactness and high performance are required. It is also required to operate reliably under high pressure. For compactness of the entire unit, seal rings also have to be as small in outer diameter as possible. It is also required that their slits can be easily widened.

Conventional seal rings made of an aromatic polyether ketone resin are low in sealbility when brought into frictional contact with a mating member at high speed at high temperature of 100° C. or over.

If the filler content in a seal ring having an outer diameter of 20 mm or under is reduced so that its slit can be more easily opened, the degree of wear tends to increase.

The larger the bending strain of the resin composition forming a seal ring, the more easily the seal ring can be fitted on a shaft.

The shaft or cylinder is usually formed from aluminum alloy for greater machinability and light weight. If a seal is mounted on a hydraulic cylinder or a piston, such a mating member made of aluminum alloy in frictional contact in lubricating oil is more liable to wear than when operating in a dry state with no lubricating oil.

This is because lubricating oil is not sufficiently supplied to the sliding surface under high-speed and high-surface pressure condition and because if a thin oil film is formed on the sliding surface, the transition of a lubricating material from an aromatic polyether ketone resin composition to the mating member does not occur. Thus neither solid or liquid lubricant is supplied to the sliding surface, so that the wear of the mating member results.

An object of the invention is to provide a lubricating resin composition that is high in wear resistance and sealability and less likely to wear or otherwise damage an aluminum alloy mating member even under insufficient supply of lubricating oil.

Another object of the present invention is to provide a lubricating resin composition that maintains high wear resistance and sealability when brought into frictional contact with a mating member at high speed at high temperature of 100° C. or over and that is less likely to damage an aluminum alloy mating member even when brought into frictional contact with the mating member at a surface pressure of 1 MPa or over.

Another object of the present invention is to provide a seal ring that is high in wear resistance and sealability and less likely to damage an aluminum alloy mating member, and particularly a seal ring having an outer diameter of 20 mm or under and having a slit which can be opened easily for easy mounting on a shaft.

SUMMARY OF THE INVENTION

According to the invention, there is provided a lubricating resin composition comprising 50–90 vol % of an aromatic polyether ketone resin, 5–30 vol % of an aromatic polyamide fiber, and 2–30 vol % of tetrafluoroethylene resin. The lubricating resin composition may be used as a seal.

By adding both an aromatic polyamide fiber as a reinforcing material and a tetrafluoroethylene resin as a lubricant in a resin composition containing an aromatic polyetherketone resin as a main component, both the wear resistance and frictional properties of the composition improve. Sealability thus improves. The specific amount of aromatic polyamide fiber improves the wear resistance of a seal made from the resin composition. Such a seal would not wear or damage an aluminum alloy mating member.

The composition according to the invention may further comprise 2–20 vol % of mica or talc, 2–30 vol % of whisker having a Mohs hardness of 3 or under, or 2–30 vol % of a particulate inorganic compound having a Mohs hardness of 3 or under.

By using both an aromatic polyamide fiber as a reinforcing material and mica or talc and whisker or particulate inorganic compound having the specific hardness, the aromatic polyamide fiber macroscopically reinforces the entire polyether ketone resin, while the mica or talc, or the whisker or particulate inorganic compound having the specific hardness microscopically reinforce the aromatic polyamide fiber.

By adding these reinforcing materials in specific amounts, they synergistically improve the wear resistance of the composition while compensating for their weak points. Thus, sealability and low attack to an aluminum alloy mating member required for the resin composition improve.

From another aspect of the invention, there is provided a seal ring formed from the lubricating resin composition and having a slit. The seal ring may have an outer diameter not exceeding 20 mm and having a bending strain (under ASTM D790) of 3% or over.

Made from such a resin composition, practically all the properties required for the seal ring improve. The use of the specific reinforcing materials improve bending elasticity of the ring. By forming a seal ring from the resin composition having a bending strain (ASTM D790) of 3% or over, its slit can be widened easily even if its outer diameter is 20 mm or under.

Other features and objects of the present invention will become apparent from the following description made with reference to the accompanying drawings, in which:

DETAILED DESCRIPTION OF THE PREFERRED EMBODIMENT

Figure 1:
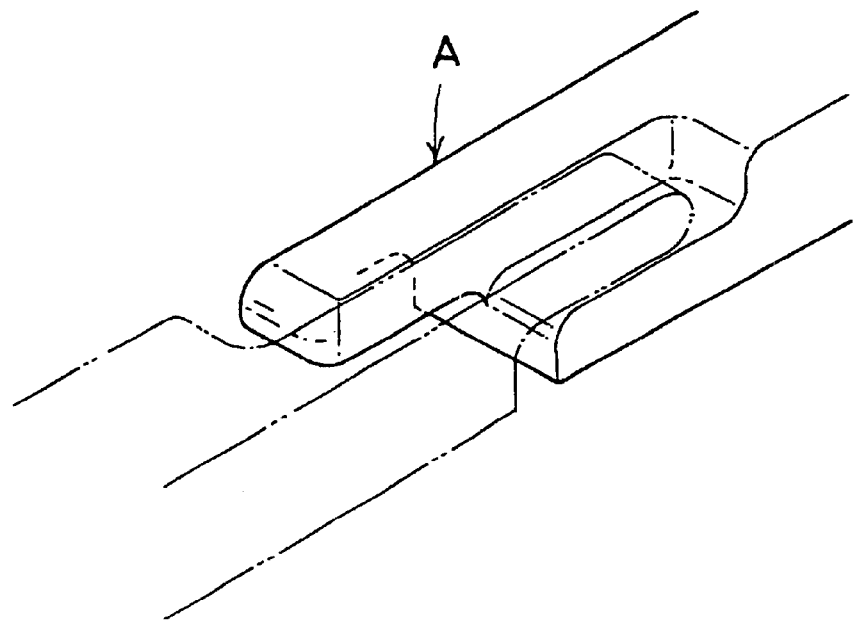
FIG. 1 is a partical perspective view of a seal ring having a step-cut slit.

The aromatic polyether ketone resin (hereinafter referred to as PEK) used in the invention may be a polymer comprising repeating units shown in Formula 1, or a copolymer produced by polymerizing the repeating units shown in Formula 1 with repeating units shown in Formula 2 such that the properties inherent to PEK are preserved.

Commercial such PEKs include PEEK made by VICTREX and expressed by Formula 3, PEK made by VICTREX and expressed by Formula 4, and Ultrapek made by BASF and expressed by Formula 5. Such PEKs may be manufactured by a known method e.g. disclosed in Japanese patent publication 54-90296.

The aromatic polyamide fiber used in the invention is an organic fiber comprising repeating units as shown in Formula 6, which are meta-series, or as shown in Formula 7, which are para-series.

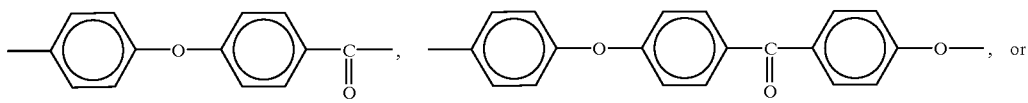

Formula 1

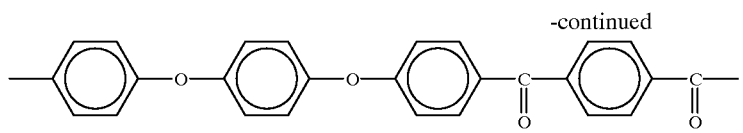

Formula 2

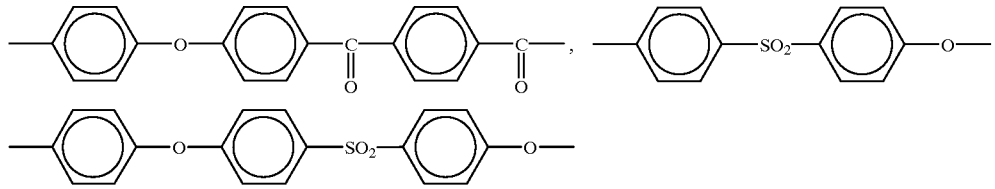

Formula 3

Formula 4

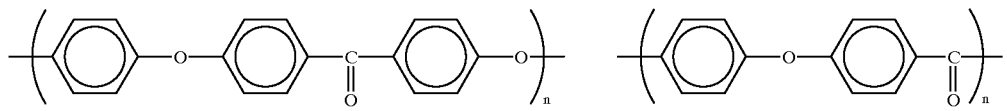

Formula 5

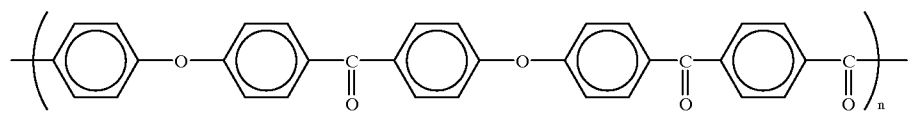

Formula 6

Formula 7

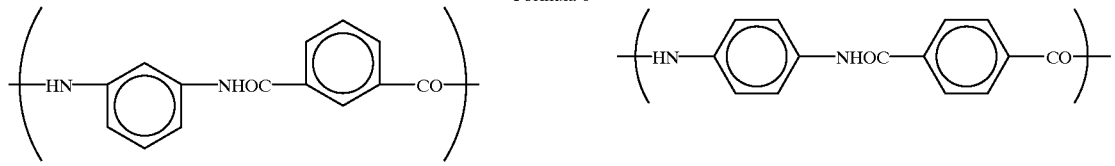

The aromatic polyamide fiber should preferably be 0.1–3 mm long, and more preferably 0.1–1.5 mm long. Fibers shorter than this range would not sufficiently improve the wear resistance. Fibers longer than this range would not uniformly disperse in the composition.

The aromatic polyamide fiber reinforces the PEK resin, thus considerably improving the wear resistance of the composition. Since this fiber is an organic fiber, it is soft and less likely to wear or otherwise damage a mating member made from an aluminum alloy (such as aluminum alloy for die-casting under JIS H2118) even if subjected to a strong frictional shearing force at the frictional surface, compared with carbon fiber.

Commercial meta-aromatic polyamide fibers that satisfy these requirements include NOMEX made by Dupont-Toray-Kevlar and CONEX made by TEIJIN. Also, commercial para-aromatic polyamide fibers include Kevlar made by Dupont-Toray-Kevlar, Twaron made by Japan Aramid and TECHNORA made by TEIJIN.

The tetrafluoroethylene resin (PTFE for short) used in this invention may be any of a molding powder produced by suspension polymerization, a fine powder produced by emulsion polymerization, or a power for a solid lubricant such as a powder heated, pressurized or heated and pulverized, or a powder heated, pulverized and irradiated by gamma or electron beams. But a powder for a solid lubricant is most preferable. Molding powder, fine powder and solid lubricant powder may be used in combination.

Commercially available such PTFEs include KTL-610, KTL-350, KT-8N, KT-400H made by KITAMURA, TEFLON 7-J and TLP-10 made by Mitsui Dupont Fluorochemical, FLUON G163, L150J and L169J made by Asahi Glass, and POLYFLON M-15 and LUBLON L-5 made by Daikin Kogyo, and HOSTAFLON TF9205 and TF9207 made by Hoechst. The PTFE may also be one modified by perfluoroalkylether groups, fluoroalkyl groups, or other side chain groups having fluoroalkyls.

The mica or talc used in this invention should have an average particle diameter of 1–50 $\mu$m, preferably 5–30 $\mu$m. Out of this range, it cannot sufficiently reinforce the composition in a microscopic sense, so that the wear resistance of the composition will be insufficient.

The whisker having a Mohs hardness of 3 or under, used in the present invention, may be magnesium sulfate whisker or calcium sulfate whisker.

Such a whisker should have a fiber length of about 50 $\mu$m, which is shorter than that of the aromatic polyamide fiber. Whisker having a much shorter fiber length would not give the composition a sufficient wear resistance.

The particulate inorganic compound having a Mohs hardness of 3 or under, used in the present invention, may be powder particles of magnesium sulfate or calcium sulfate. Calcium sulfate having a low hardness is preferable.

The particulate inorganic compound should have an average particle diameter not exceeding 100 $\mu$m, preferably 10–50 $\mu$m, slightly less than that of the aromatic polyamide fiber. It should not be less than 1 $\mu$m for sufficient wear resistance of the composition.

Since the whisker or particulate inorganic compound is smaller in length or diameter than the aromatic polyamide fiber, it is more profable that it exists at the sealing surface. Thus, a major portion of the frictional shearing force produced when the sealing surface is brought into frictional contact with the mating member is borne by the whisker or the particulate inorganic compound, thus protecting the sealing surface against wear. Since the whisker or particulate inorganic compound has a Mohs hardness of 3 or under, it will not wear or otherwise damage a mating member made of an aluminum alloy (such as aluminum alloy for die-casting under JIS H2118).

Specific such whiskers include anhydrous and semi-anhydrous salt types of calcium sulfate whisker. But the former is preferable. Commercial such whiskers are listed below.

(a) Magnesium sulfate whisker (Moshige made by Ube Kohsan) (Mohs hardness 2.5, fiber length 10–30 μm, fiber diameter 0.5–1 μm)

(b) Calcium sulfate whisker FLANKLIN fiber A-30 (anhydrous salt type) made by Dainichiseika Color & Chemicals Mfg. FLANKLIN fiber H-30 (semi-anhydrous type) made by Dainichiseika Color & Chemicals Mfg. (Mohs hardness 2–3, fiber length 50–60 μm, fiber diameter 2 μm)

Specific particulate inorganic compounds having a Mohs hardness not more than 3 include anhydrous and semi-anhydrous salt types of calcium sulfate whisker. But the former is preferable. Commercially available calcium sulfates include D-101A, D-200 (anhydrous type) and FT-2 (semi-anhydrous type) made by Noritake company Ltd.

The aromatic polyamide fiber in the PEK composition improves wear resistance while the PTFE resin improves low friction properties. A seal member made from such a PEK composition will thus not wear or otherwise damage a mating member made of an aluminum alloy (such as aluminum alloy for die-casting under JIS H2118) even if the seal is brought into frictional contact with the mating member at high speed at high temperature of 100° C. or over with a surface pressure of 1 MPa or over because the soft aromatic polyamide fiber bears most part of the frictional shearing force produced at the frictional surface.

If mica, talc, whisker or particulate inorganic compound is added to the PEK composition in addition to the aromatic polyamide fiber, the aromatic polyamide fiber reinforces the PEK composition in a relatively rough network whereas the mica, talc or whisker microscopically reinforce the composition. The wear resistance of the composition thus improves dramatically.

Such mica, talc, whisker and particulate inorganic compounds having a Mohs hardness of 3 or less is smaller than aromatic polyamide fiber. Thus, most part thereof tend to be exposed to the frictional surface and bear the surface pressure uniformly. Thus the load on the sliding surface is distributed uniformly over the entire surface. This lowers the frictional shearing force to the aromatic polyamide fiber, mica, talc, whisker or particulate inorganic compound on the frictional surface, which in turn makes the aluminum alloy mating member less likely to be damaged by the seal member.

It is thus desirable to add these materials, together with aromatic polyamide fiber, to the PEK composition as a material for a seal member, especially if the seal member is brought into frictional contact with an aluminum alloy mating member under high-temperature, high-surface-pressure conditions.

Mica and talc are flaky while whiskers are fibrous. Both microscopically reinforce the composition. But the latter is preferable. Mica has a Mohs hardness of 2–3, while talc has a Mohs hardness of only 1. In fact, talc has the lowest hardness in mineral on earth. Thus, talc is preferable to mica.

The resin composition according to the invention should comprise 50–90 vol % of an aromatic polyether ketone resin, 5–30 vol % of an aromatic polyamide fiber, and 2–30 vol % of tetrafluoroethylene resin, or further comprises 2–20 vol % of mica or talc, 2–30 vol % of whisker having a Mohs hardness of 3 or under, or 2–30 vol % of a particulate inorganic compound having a Mohs hardness of 3 or under.

If the aromatic polyamide fiber content exceeds 30 vol %, moldability of the composition and mechanical strength and wear resistance would be low. If less than 5 vol %, the reinforcing effect and thus the wear resistance would be insufficient.

Addition of more than 30 vol % of PTFE would reduce the wear resistance below the required level. If its content is less than 2 vol %, lubricity of the composition will be insufficient.

Addition of more than 20 vol % of mica or talc would reduce the wear resistance below the required level and make it difficult to mount a seal ring made from this composition on a shaft. If its content is less than 2 vol %, microscopic reinforcing effect will not be obtained and required wear resistance will not be obtained.

Addition of more than 30 vol % of whisker or particulate inorganic compound would reduce the wear resistance below the required level. If its content is less than 2 vol %, its microscopic reinforcing effect will be lost, so that the required wear resistance will not be obtained.

The total filler content should not exceed 50 vol % for good moldability and to maintain wear resistance higher than the required level. If it is less than 10 vol %, required wear resistance and lubricity will not be obtained.

To the resin composition, known additives as listed below may be further added. But care must be taken that such additives would have no evil influence on any of the intended effects of the present invention.

(1) Frictional property improvers: graphite, molybdenum disulfide, tungsten disulfide, etc.
(2) Electrical property improvers: carbon powder, zinc oxide, titanium oxide, etc.
(3) Anti-crack agent: graphite
(4) Thermal conductivity improvers: graphite, metallic oxide powder
(5) Anti-wear agents: carbon fiber, calcium carbonate whisker, zinc oxide whisker, potassium titanate whisker, aluminum borate whisker, titanium oxide whisker, etc.

These raw materials may be mixed or kneaded together by any known means. For example, they are dry-mixed in a Henschel mixer, ball mixer, ribbon blender, Ledige mixer or ultra-Henschel mixer and melt-kneaded in a melt extruder such as a twin-screw extruder to form molding pellets (granules). The pellets may be molded by extrusion molding, injection molding or heating/compression molding. Needless to say, injection molding is preferable from the viewpoint of manufacturing efficiency.

The molded products may be subjected to a treatment for improving physical properties, such as annealing. The lubricating resin composition according to the present invention may be used to manufacture a seal ring used in hydraulic units used with an automatic speed changer such as a contimous non-stage speed changer.

The resin composition of this invention can also be used for seals (such as tip seal and piston rings) for compressors in which are used a refrigerant such as carbonic acid gas, natural gas or alternative fleon, power steering seal rings for trucks, buses and other cars, and seal bearings for construction machines such as shovel cars, forklifts, bulldozers and pile drivers.

For safety's sake, the resin composition of the invention may be used for seal rings for hydraulic devices used under milder conditions than the conditions where the temperature is over 100° C. and the pressure is over 1 MPa.

The composition of the invention can also be used for the manufacture of seals adapted to be brought into frictional contact with a mating member made of a material harder than aluminum alloy, such as steel or cast iron, or seal rings having a diameter of over 20 mm.

EXAMPLES

Raw materials used in Examples are listed below. In the tables, the materials are referred to not by their full names but by designations in brackets in the following list.
(1) Aromatic polyether ketone resin [PEK] by VICTREX: PEEK450P
(2) Aromatic polyamide fiber [ARF-1] Twaron 1010 cut fiber by Japan Aramid (para, fiber length 0.25 mm, fiber diameter 12 µm)
(3) Aromatic polyamide fiber [ARF-2] Twaron 1010 cut fiber by Japan Aramid (para, fiber length 0.5 mm, fiber diameter 12 µm)
(4) Aromatic polyamide fiber [ARF-3] Twaron 1010 cut fiber by Japan Aramid (para, fiber length 1 mm, fiber diameter 12 µm)
(5) Aromatic polyamide fiber [ARF-4] Twaron 1010 cut fiber by Japan Aramid (para, fiber length 3 mm, fiber diameter 12 µm)
(6) Aromatic polyamide fiber [ARF-5] CONEX short cut fiber by TEIJIN (meta, fiber length 0.6 mm, 2 denier)
(7) Carbon fiber (pan) [CF] BESFIGHT HTA-CMF0160-OH by Toho Rayon (fiber length 0.16 mm, fiber diameter 7 µm)
(8) Magnesium sulfate whisker [magnesium sulfate w] Moshige by Ube Kosan (Mohs hardness 2.5, fiber length 10–30 µm, fiber diameter 0.5–1 µm)
(9) Calcium sulfate whisker [calcium sulfate W] FLANKLIN fiber A-30 (anhydrous salt type) by Dainichiseika Color & Chemicals Mfg. (Mohs hardness 2–3, fiber length 50–60 µm, fiber diameter 2 µm)
(10) Potassium titanate whisker [potassium titanate W] TISMO N by Otsuka Chemical (Mohs hardness 4, fiber length 10–20 µm, fiber diameter 0.3–0.6 µm)
(11) Aluminum borate whisker [aluminum borate W] ALBOREX Y by Shikoku Chemicals corporation (Mohs hardness 7, fiber length 10–30 µm, fiber diameter 0.5–1 µm)
(12) Tetrafluoroethylene resin [PTFE] KTL-610 by KITAMURA (solid lubricant powder, particle diameter 15 µm)
(13) Talc : crown talc by Matsumura Sangyo (Mohs hardness 1, particle diameter 11 µm)
(14) Mica : M-325 by Repco (Mohs hardness 2–3, particle diameter 20 µm)
(15) Graphite ACP by NIPPON GRAPHAITE INDUSTRIES (particle diameter 10 µm)
(16) Calcium sulfate powder D-101A by Noritake company Ltd (anhydrous salt) (Mohs hardness 2–3, particle diameter 25 µm

Examples 1–16, Comparative Examples 1–14

The materials were dry-blended in a Henschel mixer at the ratios (volume %) shown in Tables 1 and 2, and melt-kneaded in a twin-screw extruder to form pellets. The pellets were then molded in an injection molder with the injection pressure of 100 MPa, nozzle temperature at 400° C. and mold temperature at 180° C. to form blanks of 14 mm (inner diameter)×23 mm (outer diameter)×13 mm (width), 17 mm (inner diameter)×20 mm (outer diameter)×2.0 mm (width) seal rings A having step-cut slits as shown in FIG. 1, and 12.7 mm (width)×128 mm (length)×3.2 mm (thickness) bending test pieces. The blanks were worked into 17 mm (inner diameter)×21 mm (outer diameter)×10 mm (width) ring test pieces for friction/wear tests.

As the friction/wear tests, a ring-on-disk test and a seal ring test were conducted.

(1) Ring-on-disk test

The seal rings were tested on a ring-on-disk type tester in a lubricating oil of low viscosity (velocity oil No. 3 made by MOBILE OIL, 2 cSt-40° C.) with a mating member of aluminum alloy (ADC12: JIS H2118, Type 12) for 5 hours under a surface pressure of 2 MPa and 4 MPa at a speed of 64 meter per minute at an oil temperature of 110° C. The dynamic friction coefficient, wear of the test piece and wear of the mating member just before the end of test are shown in Tables 3 and 4.

(2) Seal ring test

Figure 2:
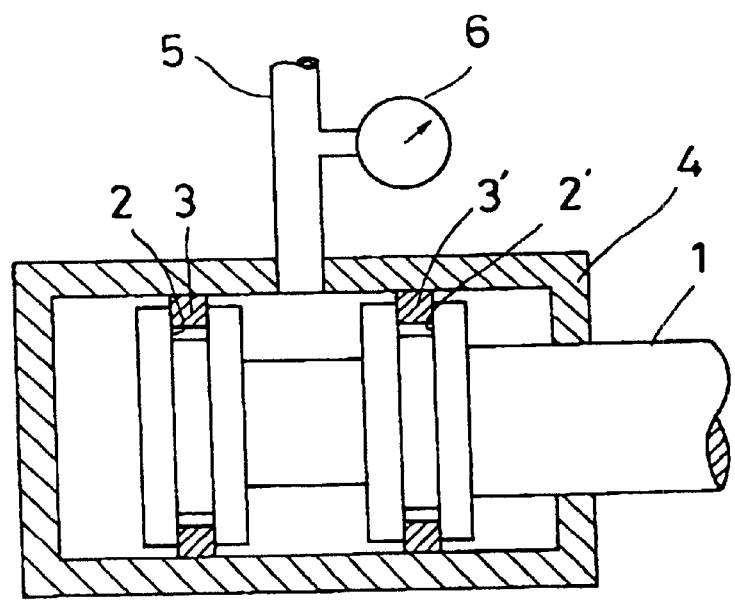
FIG. 2 is a vertical sectional view of a seal ring tester.

On a seal ring tester shown in FIG. 2, with two seal rings 3, 3' set in annular grooves 2, 2' formed in a shaft 1 made of an aluminum alloy (ADC12: JIS H2118, Type 12) and received in a cylinder 4 made of S45C, the shaft 1 was rotated to bring the seal rings 3, 3' into frictional contact with the side surfaces of the grooves 2, 2' and the inner periphery of a cylinder 4 made of S45C. Oil was fed under pressure from a hydranlic pump (not shown) provided over the cylinder 4 through a supply pipe 5 with an oil pressure set on an oil pressure gauge 6.

ATF (DEXRON made by SHOWA SHELL OIL) was used as a lubricating oil. The seal rings were tested for 100 hours under an oil pressure of 1 MPa at a shaft speed of 8000 rpm at an oil temperature of 120° C. The amount of wear of the sides (in slide contact with the grooves of the shaft 1) of the seal rings and the amount of wear of the grooves are shown in Tables 3 add 4. How easily the seal rings can be set in the grooves was evaluated and indicated by ○ (which indicates that the ring can be set in a groove easily by widening the slit in axially opposite directions), Δ (which indicates that the ring can be set in a groove, though not easily, by widening the slit in axially opposite directions), and X (which indicates that the ring broke when the slit was widened axially in opposite directions).

(3) Bending test

Under ASTM D790, bending modulus of elasticity and bending strain at normal temperature were measured. The results are shown in Tables 3 and 4.

As will be apparent from Tables 3 and 4, for Comparative Examples 1–4 and 14, which did not contain at least one of the PEK resin, aromatic polyamide fiber and PTFE, not all of the frictional property, wear resistance and tendency not to damage the mating member was met.

The seal ring of Comparative Example 5, which contained more than 40 vol % of aromatic polyamide fiber, wear to the mating member was remarkable. Also, it was small in bending strain and thus it was difficult to set it in a groove. The seal ring of Comparative Example 6 in which the content of aromatic polyamide fiber was as small as 2 vol % was poor in wear resistance.

The seal ring of Comparative Example 7, which contained less than 50 vol % of PEK resin, was small in bending strain and thus it was difficult to fit it on a shaft. The seal ring of Comparative Example 8, which contained more than 90 vol % of PEK resin and less than 2 vol % of aromatic polyamide resin, was poor in wear resistance.

The seal rings of Comparative Examples 9 and 10, which contained whisker having a hardness out of the specific range, damaged the mating member and was poor in wear resistance. The seal rings of Comparative Examples 12, 13, which contained a fibrous reinforcing material in the form of carbon fiber and potassium titanate whisker, respectively, and a solid lubricant, severely damaged the mating members.

In contrast, the seal rings of Examples 1–16 of the invention scarcely damaged the mating members (made of ADC 12) when brought into contact therewith at an oil temperature of 100° C. or over under surface pressure of 2 MPa in the ring-on-disk test. Examples 1, 2, 8, 9, 12 and 14–16 of the invention showed good frictional/wear properties under high surface pressure (4 MPa) in the ring-on-disk test.

The seal rings of Examples 1–5, 7–10, 12 and 14–16 of the invention had a bending strain of over 3% under ASTM D790 and was easily fitted on a shaft even when used as a seal ring having an outer diameter of 20 mm or under. Further, they scarcely damaged the mating member of aluminum alloy (ADC 12) and were high in wear resistance.

A seal member made from the resin composition according to the invention shows high wear resistance and sealability especially if it is brought into frictional contact with a mating member at high speed in a high temperature (100° C. or over) atmosphere. Also, it is less likely to damage the sealing surface of the mating member made of an aluminum alloy even if the surface pressure is 1 MPa or over or even if the supply of lubricating oil is not sufficient.

By adding mica, talc, whisker having a Mohs hardness of 3 or less or a particulate inorganic compound having a Mohs hardness of 3 or less, it is possible to further improve these properties.

The seal ring made from the resin composition of the present invention is high in wear resistance and sealability and less likely to damage an aluminum alloy mating member. It can be easily fitted on e.g. a shaft because its slit can be opened easily even if its outer diameter is 20 mm or less.

TABLE 1

| material (vol %) | Example | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| (1) P E K | 80 | 80 | 80 | 80 | 80 | 50 | 90 | 70 | 70 | 90 | 50 | 70 | 60 | 70 | 70 | 65 |
| (2) A R F - 1 | 10 | — | — | — | — | 30 | 5 | 10 | 10 | 5 | 20 | 10 | 10 | 10 | 10 | 10 |
| (3) A R F - 2 | — | 10 | — | — | — | — | — | — | — | — | — | — | — | — | — | — |
| (4) A R F - 3 | — | — | 10 | — | — | — | — | — | — | — | — | — | — | — | — | — |
| (5) A R F - 4 | — | — | — | 10 | — | — | — | — | — | — | — | — | — | — | — | — |
| (6) A R F - 5 | — | — | — | — | 10 | — | — | — | — | — | — | — | — | — | — | — |
| (7) C F | — | — | — | — | — | — | — | — | — | — | — | — | — | — | — | — |
| (8) magnesium sulfate W | — | — | — | — | — | — | — | 10 | — | — | — | — | — | — | — | — |
| (9) calcium sulfate W | — | — | — | — | — | — | — | — | 10 | 3 | 20 | — | — | — | — | — |
| (12) P T F E | 10 | 10 | 10 | 10 | 10 | 20 | 5 | 10 | 10 | 2 | 10 | 10 | 10 | 10 | 10 | 10 |
| (13) talc | — | — | — | — | — | — | — | — | — | — | — | — | 10 | 20 | — | — |
| (14) mica | — | — | — | — | — | — | — | — | — | — | — | — | — | 10 | — | — |
| (16) calcium sulfate powder | — | — | — | — | — | — | — | — | — | — | — | — | — | — | 10 | 10 |

TABLE 2

| material (vol %) | Comparative Example | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| (1) P E K | 70 | 70 | 70 | 70 | 50 | 97 | 40 | 96 | 70 | 70 | 70 | 70 | 70 | 70 |
| (2) A R F - 1 | 30 | — | — | — | 40 | 2 | 20 | 2 | 10 | 10 | — | — | — | — |
| (7) C F | — | — | — | — | — | — | — | — | — | — | 10 | 20 | — | — |
| (9) calcium sulfate w | — | 30 | — | — | — | — | 20 | 1 | — | — | — | — | — | — |
| (10) potassium titanate W | — | — | — | — | — | — | — | — | 10 | — | — | — | 15 | — |
| (11) aluminum borate W | — | — | — | — | — | — | — | — | — | 10 | — | — | — | — |
| (12) P T F E | — | — | 30 | — | 10 | 1 | 20 | 1 | 10 | 10 | 10 | 10 | — | — |
| (13) talc | — | — | — | 30 | — | — | — | — | — | — | — | 10 | — | — |
| (15) graphite | — | — | — | — | — | — | — | — | — | — | — | — | 15 | 30 |

TABLE 3

| items | Example | | | | | | | | | | | | | | |
|---|---|---|---|---|---|---|---|---|---|---|---|---|---|---|---|
| | 1 | 2 | 3 | 5 | 6 | 7 | 8 | 9 | 10 | 11 | 12 | 13 | 14 | 15 | 16 |
| 2 MPa | | | | | | | | | | | | | | | |
| (1) ring-on-disk test | | | | | | | | | | | | | | | |
| dynamic friction coefficient | 0.10 | 0.10 | 0.11 | 0.13 | 0.11 | 0.09 | 0.14 | .09 | 0.09 | 0.15 | 0.10 | 0.10 | 0.10 | 0.12 | 0.11 | 0.09 |
| wear of resin member (μm) | 12 | 14 | 15 | 20 | 18 | 16 | 28 | 5 | 3 | 25 | 10 | 3 | 7 | 10 | 9 | 4 |
| wear of mating member (mg) | 0.2 | 0.2 | 0.3 | 0.5 | 0.4 | 0.3 | 0.7 | 0.1 | 0.1 | 0.5 | 0.3 | 0.2 | 0.2 | 0.3 | 0.4 | 0.1 |
| 4 MPa | | | | | | | | | | | | | | | |
| (1) ring-on-disk test | | | not | not | not | not | not | | | not | not | | not | | | |
| dynamic friction coefficient | 0.10 | 0.11 | tested | tested | tested | tested | tested | 0.08 | 0.08 | tested | tested | 0.09 | tested | 0.11 | 0.08 | 0.09 |
| wear of resin member (μm) | 20 | 21 | | | | | | 10 | 7 | | | 15 | 17 | 8 | 5 | |
| wear of mating member (mg) | 0.7 | 0.6 | | | | | | 0.3 | 0.2 | | | 0.4 | | 0.9 | 0.2 | 0.3 |

TABLE 3-continued

| items | Example | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| (2) seal ring test | | | | | | | | | | | | | ✕ | | | |
| ease of mounting in groove | ○ | ○ | ○ | ○ | ○ | ○ | x | ○ | ○ | ○ | ○ | X | ○ | △ | ○ | ○ |
| wear of seal ring side (μm) | 7 | 8 | — | — | — | — | — | 5 | 3 | — | — | 6 | — | 7 | 5 | 2 |
| wear of shaft groove (μm) | 3 | 3 | — | — | — | — | — | 3 | 2 | — | — | 3 | — | 4 | 2 | 3 |
| (3) bending test | | | | | | | | | | | | | | | | |
| bending elasticity modulus (MPa) | 4000 | 4200 | 4200 | 4400 | 4100 | 7000 | 3800 | 6800 | 6900 | 3900 | 8200 | 7000 | 8200 | 7200 | 6500 | 8000 |
| bending strain (%) | 5.6 | 5.4 | 5.4 | 5.2 | 5.6 | 2.0 | 8.5 | 4.0 | 4.1 | 8.4 | 1.9 | 3.7 | 2.8 | 3.6 | 4.3 | 3.5 |

✕ Test was impossible.

TABLE 4

| items | Comparative Example | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| (1) ring-on-disk test (2 MPa) | | | | | | | | | | | | | | |
| dynamic friction coefficient | 0.22 | 0.18 | 0.12 | 0.21 | 0.18 | 0.18 | 0.13 | 0.17 | 0.19 | 0.23 | 0.15 | 0.24 | 0.22 | 0.11 |
| wear of resin member (μm) | 105 | 258 | 290 | 320 | 128 | 520 | 188 | 490 | 124 | 16.0 | 170 | 314 | 289 | 324 |
| wear of mating member (mg) | 1.0 | 0.8 | 1.0 | 0.5 | 0.9 | 0.3 | 0.5 | 0.5 | 2.0 | 2.5 | 2.5 | 15.8 | 14.8 | 2.5 |
| (2) seal ring test | | | | ✕ | ✕ | | ✕ | | | | | | | ✕ |
| ease of mounting in groove | ○ | ○ | ○ | x | x | ○ | x | ○ | ○ | ○ | ○ | ○ | ○ | x |
| wear of seal ring side (μm) | 20 | — | — | — | — | — | — | — | 20 | 24 | 22 | 31 | — | — |
| wear of shaft groove (μm) | 8 | — | — | — | — | — | — | — | 10 | 15 | 12 | 22 | — | — |
| (3) bending test | | | | | | | | | | | | | | |
| bending elasticity modulus (MPa) | 6100 | 6600 | 3300 | 8700 | 7200 | 3700 | 8000 | 3700 | 7000 | 6900 | 8850 | 11500 | 9600 | 7300 |
| bending strain (%) | 4.1 | 4.2 | 4.3 | 2.6 | 1.7 | 9.9 | 1.0 | 9.7 | 4.0 | 4.0 | 3.3 | 4.0 | 3.0 | 2.5 |

✕ Test was impossible.

We claim:

1. A seal ring formed from a lubricating resin composition comprising:

50–90 vol % of an aromatic polyether ketone resin,

5–30 vol % of an aromatic polyamide fiber, and

2–30 vol % of a tetrafluoroethylene resin;

wherein the seal ring has an outer diameter not exceeding 20 mm and has a bending strain (under ASTM D790) of 3% or more.

2. The seal ring of claim 1, wherein said composition further comprises 2–20 vol % of mica or talc.

3. The seal ring of claim 1, wherein said composition further comprises 2–30 vol % of whisker having a Mohs hardness of 3 or less.

4. The seal ring of claim 1, wherein said composition further comprises 2–30 vol % of a particulate inorganic compound have a Mohs hardness of 3 or less.

5. The seal ring of claim 4, wherein said inorganic compound is calcium sulfate.

6. The seal ring of claim 1, further comprising a slit for opening the seal ring.

7. A sealing construction comprising the seal ring of claim 1 and a mating member made of an aluminum alloy.

* * * * *